United States Patent [19]
Barrows

[11] Patent Number: 5,771,790
[45] Date of Patent: Jun. 30, 1998

[54] APPARATUS FOR DELAYING THE RIPENING OF FRUIT

[76] Inventor: Matthew Barrows, 2615 N. Causeway, Apt D77, Mandeville, La. 70471

[21] Appl. No.: 506,065

[22] Filed: Jul. 24, 1995

[51] Int. Cl.[6] .............................. A23B 7/04; A23L 3/00; A23L 3/36
[52] U.S. Cl. ............................. 99/476; 99/467; 211/113; 248/686
[58] Field of Search ............................ 99/467–479, 494, 99/483; 211/113, 126; 206/557; 248/686; D6/315

[56] References Cited

U.S. PATENT DOCUMENTS

| | | | |
|---|---|---|---|
| D. 290,200 | 6/1987 | Tabach | D6/462 |
| D. 290,558 | 6/1987 | Zorrilla | D6/462 |
| D. 300,790 | 4/1989 | Beckwith | D6/462 |
| 3,459,116 | 8/1969 | McDonnell | 99/239 |
| 4,506,600 | 3/1985 | Hersom et al. | 99/474 |
| 4,779,524 | 10/1988 | Wade | 99/476 |
| 4,824,685 | 4/1989 | Bianco | 426/418 |
| 5,318,789 | 6/1994 | Nakagawa et al. | 99/467 X |
| 5,373,780 | 12/1994 | Bianco | 99/475 |
| 5,419,153 | 5/1995 | Hartley | 99/468 X |
| 5,531,158 | 7/1996 | Perryman, Jr. | 99/467 |
| 5,566,608 | 10/1996 | Vejdani et al. | 99/475 |

*Primary Examiner*—Timothy F. Simone
*Attorney, Agent, or Firm*—Joseph T. Regard, Ltd.

[57] ABSTRACT

The present invention relates to perishable food storage systems, and in particular to a system for delaying the ripening process for bananas or the like. The present invention delays the ripening process by decreasing the concentration of ethylene gas in the air adjacent to the bananas. The preferred embodiment of the present invention accomplishes this by using a spreading mechanism to spread the hand of bananas, coupled with a fan or the like to direct air flow through and then away from the hand of bananas, thereby decreasing the ethylene gas concentration of the adjacent air, and thus decreases the ripening rate. The benefit of this method of removing ethylene gas is that it is inexpensive and easy to implement in conjunction with the specially designed rack, which is configured for holding a hand of bananas.

15 Claims, 3 Drawing Sheets

APPARATUS FOR DELAYING THE RIPENING OF FRUIT

TECHNICAL FIELD OF THE INVENTION

The present invention relates to perishable food storage systems, and in particular to a system for delaying the ripening process for bananas or the like. The present invention delays the ripening process by decreasing the concentration of ethylene gas in the air adjacent to the bananas. The preferred embodiment of the present invention accomplishes this by providing a banana rack system having a spreading mechanism to spread a hand of bananas, coupled with a fan or the like to direct air flow through and then away from the hand of bananas, thereby decreasing the ethylene gas concentration of the adjacent air, and thus decreases the ripening rate. The benefit of this method of removing ethylene gas is that it is inexpensive and easy to implement in conjunction with the specially designed rack, which is configured for holding a hand of bananas.

BACKGROUND OF THE INVENTION

While there has existed for years stands and racks for holding fruit, including banana stands or the like, the inventor knows of no system for delaying the ripening of bananas, grapes or other fruit in a system which is relatively inexpensive and easily implemented by the consumer.

There are various other banana racks on the market in the fashion of U.S. Pat. Nos. D290200, D290558, D300790. These are simple racks for hanging bananas which provide no mechanism for delaying ripening.

Most of the prior art dealing with bananas is concerned with pre-climacteric bananas. When bananas are first picked from the tree, they are in the pre-climacteric stage. While in this stage, the bananas are very green and will last a long period of time without ripening. Bananas in the pre-climacteric stage are in a suspended state in which very little or no ripening occurs. Bananas can be preserved in the pre-climacteric stage long enough to be shipped around the world. The major factor that determines whether bananas stay in the pre-climacteric stage is the presence of ethylene gas.

As long as no ethylene gas comes in contact with the bananas, then they will stay in the pre-climacteric stage and will not ripen. Most of the prior art deals with keeping bananas in this pre-climacteric stage. There are various banana bags and storing systems that keep the atmosphere controlled around the pre-climacteric bananas.

There are cooling systems that also help to keep the bananas in the pre-climacteric stage. Once the bananas have been shipped to their distribution location then a controlled ripening procedure is followed. The pre-climacteric bananas are put in a banana room and a small concentration of ethylene gas is injected into the room for approximately 48 hours. This ethylene gas causes the bananas to cross over into the post-climacteric or rapid ripening stage. Once the bananas become post-climacteric, the ethylene gas is removed to avoid uneven ripening. The post-climacteric bananas themselves actually start to produce ethylene gas.

One invention for removing the ethylene gas from the ripening rooms is U.S. Pat. No. 4,506,599. This invention like most for banana ripening is for use in the ripening rooms just after the bananas have entered the post-climacteric stage. Once the bananas are in the post-climacteric stage, they will ripen quickly. As soon as the bananas enter the post-climacteric stage they are sent to the grocers shelf where they have a very short shelf life of less than a week.

The shelf life is so short because once the bananas have crossed over into the post-climacteric stage, the bananas themselves produce a great deal of ethylene gas which increases the ripening rate. So ripening is fast and irreversible.

The biggest problem this causes is the fact that for the consumer the bananas are usually totally brown in less than a week. There has been very little development in preserving the post-climacteric bananas for the retail establishment or consumer. U.S. Pat. No. 3,459,116 makes post-climacteric bananas last longer for the retail establishment by controlling the temperature of the bananas. By cooling the bananas, this invention slows down the ripening process.

The problem with the aforementioned invention is that it is simply too complicated and expensive for most consumers and retail establishments especially for the sole purpose of making bananas last longer.

GENERAL SUMMARY DISCUSSION OF THE INVENTION

The present invention provides a relatively inexpensive, easily implemented and effective system for delaying the ripening of bananas and other fruit, including, for example, grapes or bags of citrus products, such as oranges, grapefruits, lemons or the like.

The preferred embodiment of the present invention contemplates a relatively simple and inexpensive rack on which one or two hands of bananas are hung. The invention provides a mechanism for delaying ripening of bananas for the consumer or retail establishment.

The present invention provides a system for delaying the ripening of bananas in the post-climacteric stage. Post-climacteric bananas are known to ripen at a rapid rate thus lasting a very short period of time for the home consumer or retail establishment.

The positive correlation between ripening rates and ethylene gas is well known for bananas and many other fruit. Because bananas produce a large amount of ethylene gas as they ripen, the effect is autocatalytic and thus by ripening, the bananas increase their own ripening rate. It is the purpose of this invention to make post-climacteric bananas last longer by removing the ethylene gas produced by the bananas.

This invention is a rack for hanging post-climacteric bananas which is characterized by a banana hand-spreading device and an active ventilation device for the purpose of making bananas ripen slower by removing, or ventilating, ethylene gas. This invention is intended for use at the final stage of the banana's life by the consumer or retail establishment.

The invention consists of the base, the vertical support member, the banana support members, the banana hand-spreading cords, and the active ventilation device. As a hand of bananas is slid onto the banana support members, the banana hand-spreading cords are automatically weaved into the hand of bananas spreading the hand of bananas without disconnecting the bananas from the hand.

The purpose of spreading the hand is to increase natural diffusion and ventilation of ethylene gas especially from the inner bananas of the hand which usually ripen fastest. The hand-spreading cords are attached to the tips of the banana supports and to the base. The spreading of the hand of bananas is accomplished easily, gently, and automatically as the hand is hung on the rack. Once the hand of bananas is hung on the rack, an active ventilation system provides active removal of ethylene gas. The active ventilation device is characterized by a fan or the like which is powered by a motor.

The fan is arranged in such a way to direct air flow through and then away from the hand of bananas. This ventilation decreases the concentration of ethylene gas adjacent to the bananas. When used in conjunction, the hand-spreading cords and fan reduce the concentration of the ethylene gas surrounding even the inner bananas of the hand. As described above, the invention reduces the ethylene concentration of the air surrounding the bananas which reduces the ripening rate which makes the bananas last longer.

While the preferred embodiment of the present invention is contemplated to be utilized in conjunction with bananas, the present system should be suitable for delaying ripening or over-ripening of various fruits. For example, a bunch of grapes could be hung on the stand, if desired, to provide air flow between the grapes to prevent contact via the spreading action, while the increased air flow prevents stagnant air pockets which might breed fungal infestations or rotting, thereby increasing the edible life of the fruit, while preventing infestations of fruit flies.

It is therefore an object of the present invention to provide a system for delaying the ripening of bananas and other fruit.

It is another object of the present invention to provide a system for delaying the ripening or over-ripening of bananas, or other fruit, which is relatively inexpensive to manufacture, easy to use, and effective in operation.

It is another object of the present invention to provide a system for delaying the ripening or over-ripening of bananas, or other fruit, which utilizes forced air flow through the fruit to be preserved.

It is still another object of the present invention to provide a system for delaying the ripening or over-ripening of bananas, or other fruit, which includes spreading means for facilitating enhanced air flow through the various pieces of fruit.

It is still another object of the present invention to provide a system for delaying the ripening or over-ripening of bananas, or other fruit, which is attractive and able to be displayed and used in the user's home.

Lastly, it is an object of the present invention to provide a system for delaying the ripening or over-ripening of bananas, or other fruit, on a system which may be utilized in a larger, industrial scale, or in supermarkets or the like.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
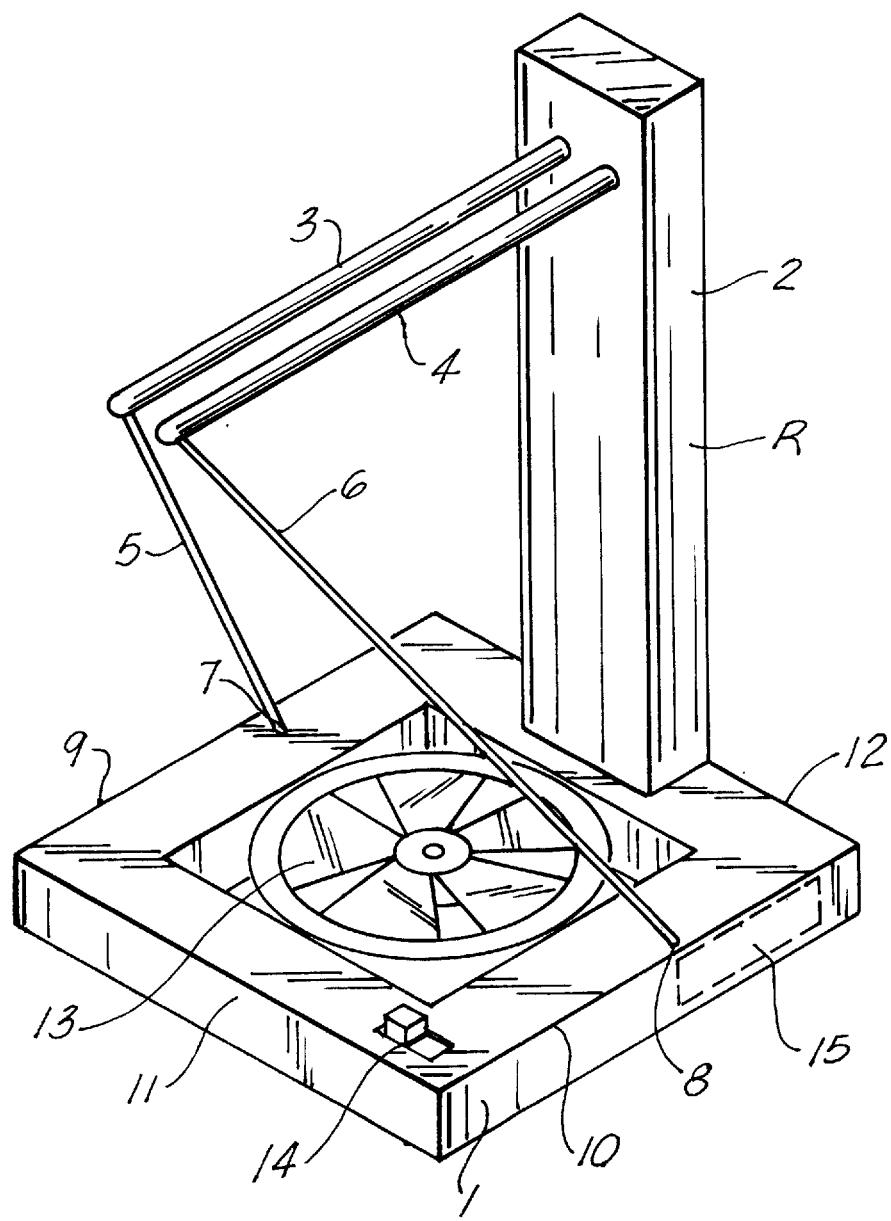
FIG. 1 is an isometric view of the invention.

FIG. 1 illustrates the preferred embodiment of the present invention, illustrating the rack R, having a base, a vertical support 2, and first and second horizontal supports 3, 4, respectively, configured to receive a hand of bananas or the like.

Affixed to the distal, outer ends of the horizontal supports 3, 4 is the first ends of first and second spreader assemblies 5, 6, respectively, configured to run in rather taut fashion, with the opposing, second ends of said spreader assemblies affixed to the base 1 at or near opposing side edges, or near the front 11 or rear 12 edges.

Situated in the base 1 generally under the horizontal supports, and between the first and second spreader assemblies is a fan 13, configured to drive air upward between said spreader assemblies and generally toward said horizontal supports. Batteries 15 in a battery compartment in the base, or exterior power, may be provided to drive the fan 13, which may be initiated via switch 14 located on top of the base. In the alternative, a photovoltaic cell may be situated on the base and/or vertical support member for providing solar power to the fan.

The present fan/support system is configured to actively removes ethylene gas and/or stagnant air from the vicinity of the stored banana or other fruit, to thereby slow down the ripening process to make post-climacteric bananas last longer.

The device of FIG. 1 of the drawings illustrates an embodiment of the invention made for home use. This design, with its two horizontal supports 3,4 is configured for hanging one or two hands of, for example, three bananas across, and one or two bananas deep. The entire rack may be made of wood or equivalent material, with the exception of the spreader assembly and the fan.

While the spreader assemblies could be made of wood, they should preferably be made of some flexible material, such as, for example, cotton or leather. The fan assembly shall be made of standard commercial fan parts and electrical motor. The base 1 serves as the general support for the rack and fan assembly, and in the preferred, exemplary embodiment has a width of, as an example, 8 inches and a length of 9 inches. The vertical support member 2 is attached to the base and provides support to the horizontal supports 3, 4. The vertical support shall be of a height sufficient to hold the bananas so that they do not touch the base, in this embodiment the vertical support has a width of, as an example 2 inches, and a height of 10 inches.

Figure 2:
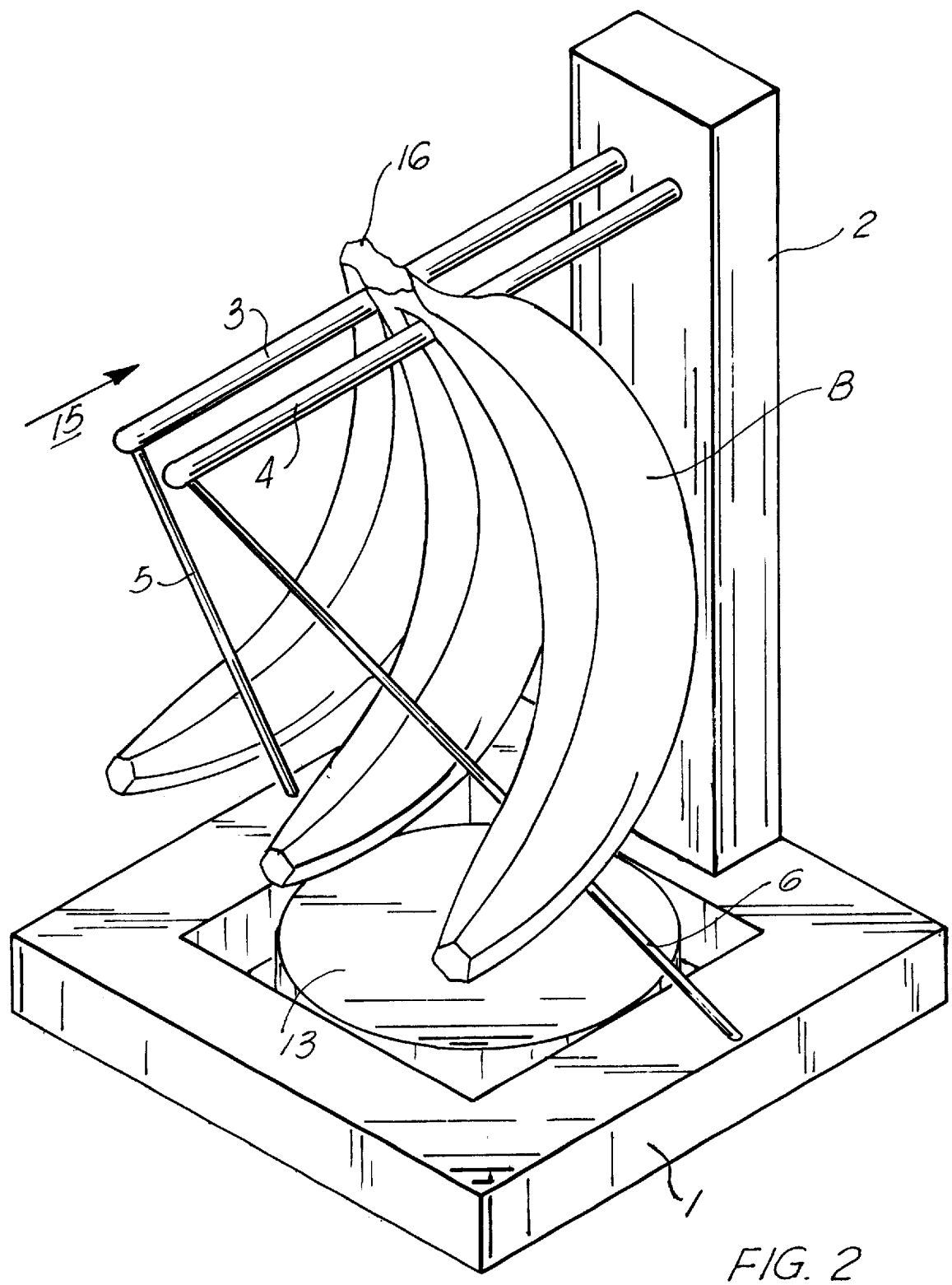
FIG. 2 is an isometric view of the invention with a hand of bananas hanging on it. Only three bananas are shown hanging on the rack for the purpose of making the mechanism of the invention easier to observe.

The horizontal supports 3, 4 are secured to the vertical support 2 and provide support for the hand of bananas that is hung on the rack. As can be seen in FIG. 2, the hand of bananas B, is urged 15 about the horizontal supports, generally toward the vertical support 2, so that the stalk 16 is generally separated and supported by the horizontal supports 3, 4, and the bananas are spread apart by spreader assemblies 5, 6.

As the user installs the bananas onto the stand, the spreader assemblies can be seen spreading the outer bananas, as they are urged toward the vertical support 2, as the bananas contact the spreader assemblies 5, 6 which run from their generally centrally situated, forward position, in contact with the horizontal supports 3, 4, to their rather opposed, separated, rear position, in contact with the base 1.

The bananas, are thereby automatically weaved into their final position, centered over the fan 13 area when the hand is slid onto the horizontal supports 3,4. The fan assembly 13 is arranged in such a way to direct air flow up and through the hand of bananas B.

The horizontal supports may be made, for example, of wood, plastic, metal or any other appropriate material. The banana supports should be made of a diameter small enough to easily slide through the stems of the hand. This diameter may vary but can be, for example, approximately 2 to 5 mm.

To increase their support strength, the horizontal supports may be made of an oval cross sectional shape as shown by FIG. 3, but the width of each horizontal support still should preferably not be larger than the previously mentioned diameter. The distance between horizontal supports 3, 4 must be large enough to allow the banana stem to slide through but not too large as to make inserting the banana supports into the hand difficult.

This distance between the horizontal supports may be, for example, approximately 1 cm. The length of each horizontal support can vary according to how many hands of bananas the rack is intended to hold.

In the preferred, exemplary embodiment, which can hold two hands of bananas, the appropriate length of the horizontal supports is approximately 8 inches. The horizontal supports are attached in a secure way to the vertical support. The horizontal supports need not necessarily be perfectly linear, may be made in varying shapes and varying angles as may be necessary.

It is advantageous that the spreader assemblies be made of a material having a soft, somewhat flexible surface so as to not scratch or otherwise damage the surface of the bananas.

Figure 3A:
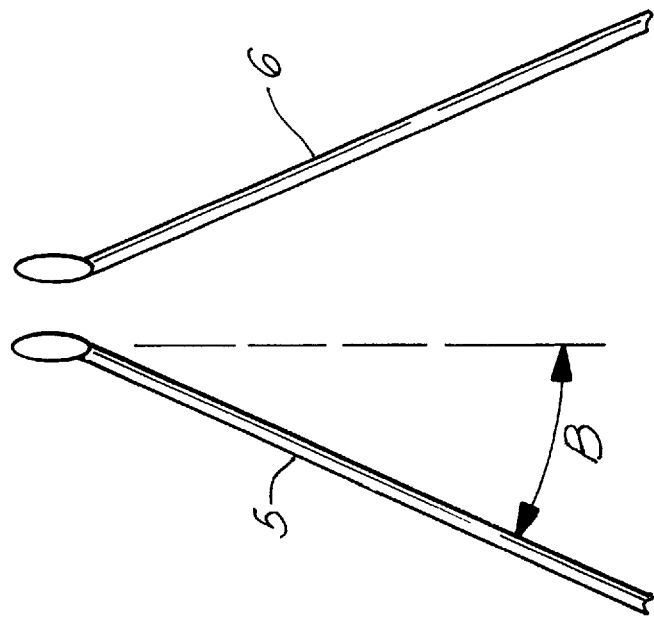
FIG. 3 shows the front and side view of the banana support members and banana hand-spreading cords.
Figure 3B:
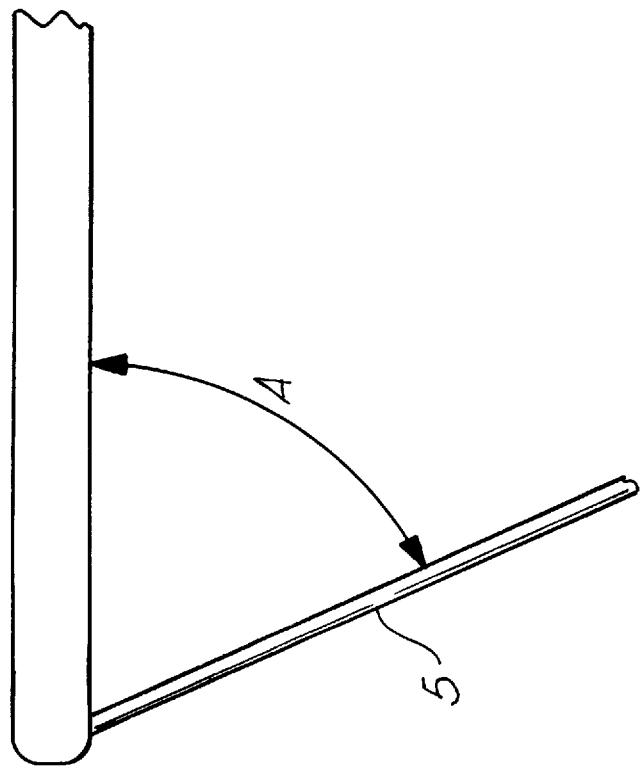

Referring to FIGS. 3a and 3b, The exact location of the base attachment of each spreader assembly 5,6 may vary but shall be determined according to the following criteria. Each spreader assembly 5, 6 must be arranged at a particular angle as to sufficiently spread the hand of bananas. The angles A and B are shown in FIG. 3. In the preferred exemplary embodiment, A is, for example, between about 60 degrees and 70 degrees, and B is between about 20 degrees and 30 degrees Thus, the first, upper ends of said spreader assemblies are closer to one another than their respective second lower ends.

Each spreader assembly 5, 6 should preferably be secured in such a way as to apply enough tension on the cords to sufficiently support the outer bananas of the hand and to spread the hand apart as shown in FIG. 2.

The active ventilation system shall be made of a fan 13 or the like, as shown in FIG. 1. The fan shall be mounted in the base of the rack in such a way to direct air flow through and then away from the hand of bananas. The diameter of the fan assembly in this embodiment is approximately 10 cm.

The ventilation assembly shall have the appropriate accessories necessary such as a power source, motor, finger guard and fan blade. It may be powered by various electrical sources including AC, batteries or photovoltaic.

The air flow required by the active ventilation source may vary according to the size of the rack, but shall provide enough air flow to move the air through and away from the bananas. One such suitable fan is an axial box fan of the fashion used for cooling electrical components with a capacity of, for example, approximately 25–50 cubic feet per minute.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. An apparatus for delaying the ripening of a bunch of fruit, comprising:

support means for supporting a bunch of fruit;

spreader means associated with said support means, said spreader means for spreading said fruit;

air flow means for directing a current of air through said spread fruit;

a base having a top face, said base further supporting said air flow means, said base configured such that the current of air generated by said air flow means emanates from said top face of said base;

wherein said support means is situated generally above said top face of said base.

2. The apparatus of claim 1, wherein said air flow means comprises a fan.

3. The apparatus of claim 2, wherein said fan is situated in said base.

4. The apparatus of claim 3, wherein said support means is situated generally above said top face of said base.

5. The apparatus of claim 4, wherein said spreader means comprises first and second support members having first and second ends, said first and second support members situated in generally parallel fashion relative one another.

6. The apparatus of claim 5, wherein said spreader means comprises first and second spreader members having first and second ends, said first ends of said spreader members communicating with said first ends of said support members, said second ends of said spreader members communicating with said base.

7. The apparatus of claim 6, wherein said first and second spreader members are fabricated of a member flexible along its length.

8. The apparatus of claim 6, wherein each of said spreader members are situated at an angle of between sixty and seventy degrees relative to said communicating support member.

9. The apparatus of claim 8, wherein said first ends of said spreader members is situated in closer proximity than said second ends of said spreader members.

10. An apparatus for delaying the ripening of a bunch of fruit, comprising:

a base member having a top face;

air flow means contained by said base member, said air flow means for providing a flow of air emanating from said top face of said base member;

a fruit support member situated above, said air flow means, said support member configured for receiving and supporting said bunch of fruit, said support member having first and second ends, and a vertical support member having first and second ends, said first end communicating with said base member, said second end communicating with said support member, said vertical support member configured to support said fruit support member;

spreader means associated with said vertical support member, said spreader means for spreading said fruit, said spreader means further comprising first and second spreader members having first and second ends.

11. The apparatus of claim 10, wherein there is further provided spreader means associated with said support means, said spreader means for spreading said fruit, said spreader means further comprising first and second spreader members having first and second ends.

12. The apparatus of claim 11, wherein said spreader means comprises first and second spreader members having first and second ends, said first ends of said spreader members communicating with said first ends of said support members, said second ends of said spreader members communicating with said base.

13. The apparatus of claim 11, wherein said first and second spreader members are fabricated of a member flexible along its length.

14. The apparatus of claim 11, wherein each of said spreader members are situated at an angle of between sixty and seventy degrees relative to said communicating support member.

15. The apparatus of claim 11, wherein said first ends of said spreader members is situated in closer proximity than said second ends of said spreader members.

\* \* \* \* \*